United States Patent [19]

Janda

[11] Patent Number: 5,629,569
[45] Date of Patent: May 13, 1997

[54] THERMAL PHOTOCONTROL SWITCH CIRCUIT

[75] Inventor: Rudy Janda, Spring Grove, Ill.

[73] Assignee: Intermatic, Inc., Spring Grove, Ill.

[21] Appl. No.: 440,745

[22] Filed: May 15, 1995

[51] Int. Cl.[6] .................................................. H01H 71/10
[52] U.S. Cl. .................. 307/117; 337/4; 337/6; 337/142; 337/163; 337/403; 337/405; 337/415; 337/416; 338/49; 338/92; 338/93; 338/94; 338/95; 361/24; 361/58
[58] Field of Search .......................... 307/117; 337/163, 337/142, 222, 4, 6, 403, 405, 415, 416; 361/24, 58, 110; 250/214 AL, 214 R; 338/49, 92, 93, 94, 95

[56] References Cited

U.S. PATENT DOCUMENTS

| | | | |
|---|---|---|---|
| 2,667,551 | 1/1954 | Berthel | 200/123 |
| 3,327,197 | 6/1967 | Marquis | 318/430 |
| 3,421,026 | 1/1969 | Andrich | 318/442 |
| 3,737,761 | 6/1973 | Walther | 307/130 |
| 3,886,408 | 5/1975 | Klayum et al. | 317/16 |
| 3,916,183 | 10/1975 | Duve et al. | 250/206 |
| 3,983,407 | 9/1976 | Shott | 307/146 |
| 4,042,853 | 8/1977 | Duve | 315/155 |
| 4,268,813 | 5/1981 | Burch | 337/118 |
| 4,276,531 | 6/1981 | Davis | 337/407 |
| 4,540,892 | 9/1985 | Carvalho | 307/130 |
| 4,587,417 | 5/1986 | Duve et al. | 250/24 |
| 4,991,054 | 2/1991 | Walters | 361/165 |
| 4,999,615 | 3/1991 | Toupin et al. | 340/590 |
| 5,084,691 | 1/1992 | Lester et al. | 333/297 |
| 5,107,440 | 4/1992 | Callahan et al. | 364/492 |
| 5,132,596 | 7/1992 | Walters et al. | 315/159 |
| 5,196,820 | 3/1993 | Ubukata | 337/368 |
| 5,241,444 | 8/1993 | Yeh | 361/59 |
| 5,255,148 | 10/1993 | Yeh | 361/93 |
| 5,305,175 | 4/1994 | Yeh | 361/63 |
| 5,325,023 | 6/1994 | Martich | 315/159 |

*Primary Examiner*—William M. Shoop, Jr.
*Assistant Examiner*—Albert W. Paladini
*Attorney, Agent, or Firm*—Brinks Hofer Gilson & Lione

[57] ABSTRACT

A self-configuring photoelectric control circuit for controlling operation of a load based on ambient light. The photocontrol circuit comprises a photocell responsive to ambient light, a heating resistor connected to the photocell, a bimetallic element in proximity to the heating resistor and movable in response to generation of heat from the heating resistor. A switch is operated by the bimetallic element and is connected between an input connected to a power source and an output connected to the load. A series resistor is connected to the heating resistor and a shunt is connected across the series resistor to provide a current bypass around the series resistor for operation with a low voltage power source, for instance 120 volts. The shunt is maintained in a flexed condition to form the bypass and a connection of the shunt across the series resistor is formed of a meltable material. When a high voltage source is connected to the input for a duration of time, the heating resistor generates sufficient heat to cause melting of the meltable material thereby permitting relaxation of the resilient shunt opening the bypass.

17 Claims, 1 Drawing Sheet

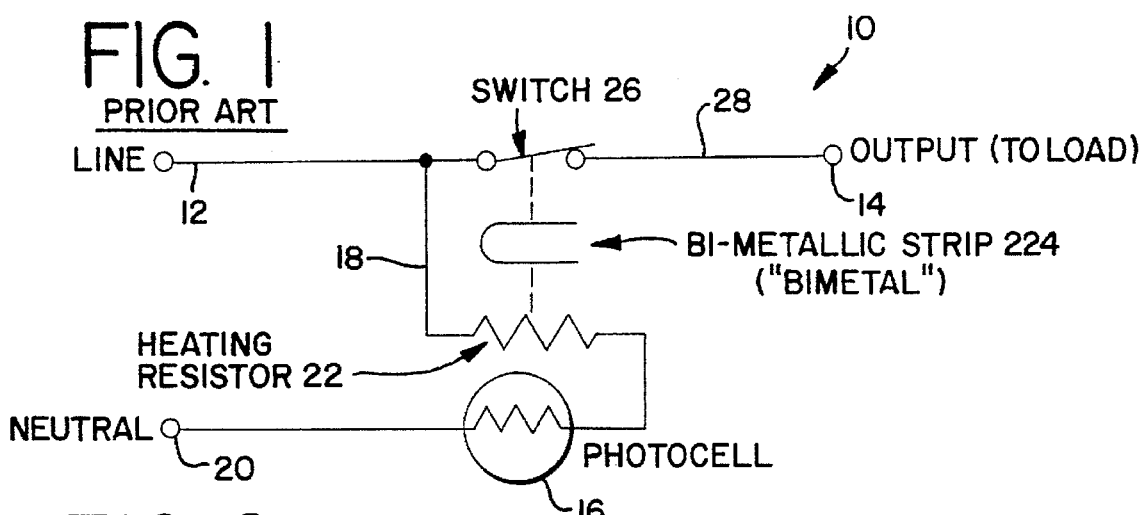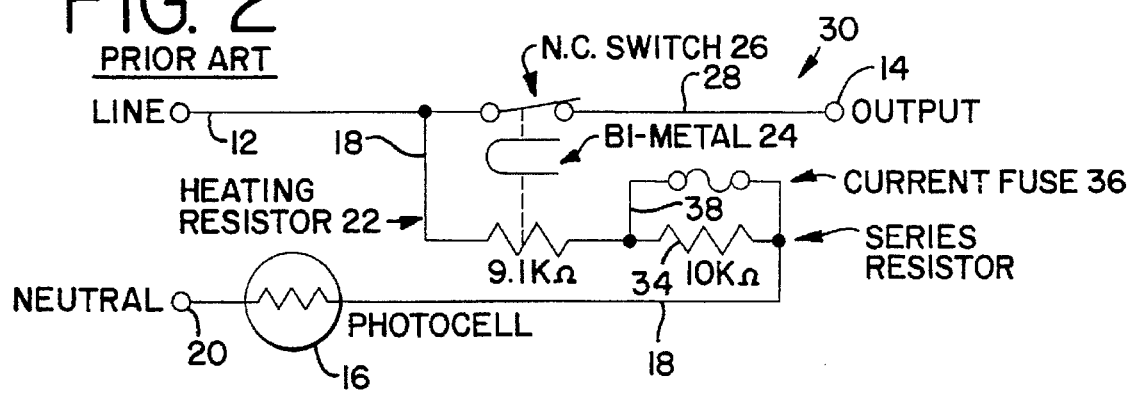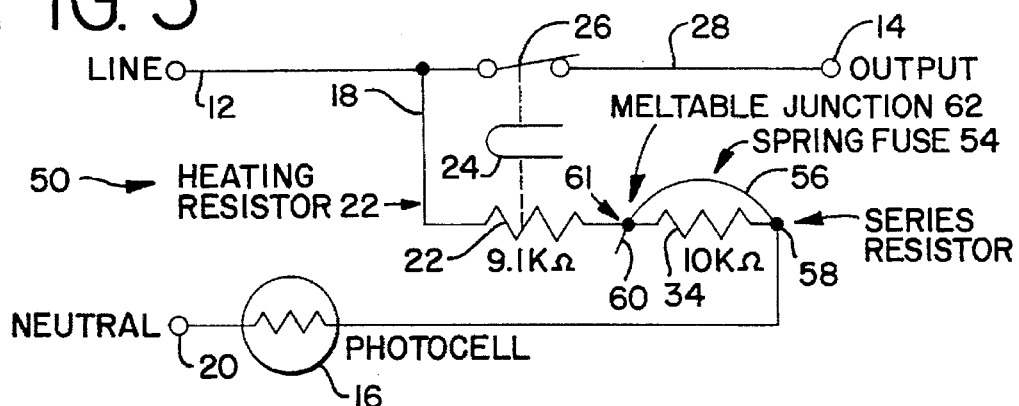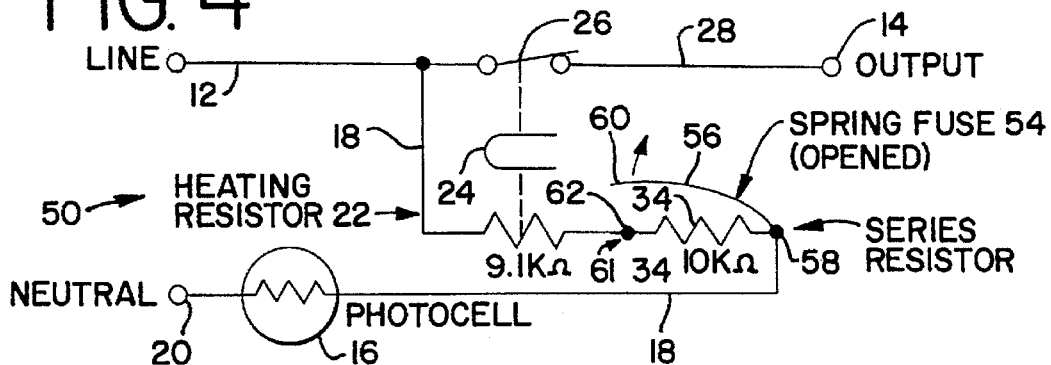

THERMAL PHOTOCONTROL SWITCH CIRCUIT

BACKGROUND OF THE INVENTION

The present invention relates to a thermal photoelectric switch circuit. More particularly, the present invention relates to a low cost photocontrol switching circuit that is adaptable for use in multiple voltage applications.

A thermal photoelectric switch circuit (also referred to as a "photo control") is used to control outdoor lighting, such as street lights, security lights, and sign lighting. A thermal photo control switch circuit includes a heating element controlled by a photocell. During daylight, heat dissipated by the heating element induces movement in a thermally-dynamic actuator to operate a load switch.

An example of a conventional photocontrol circuit is illustrated in FIG. 1. A power source is connected to a line input 12 and a load is connected to an output 14. A photocell 16 is connected in a first current path 18 between the line input 12 and a neutral 18. The photocell 16 is responsive to ambient light so that it is conductive in the presence of light, e.g. daytime. Also in the first current path 18 is a heating element 22 which may be a resistor. A bimetal element 24 is located in proximity to the heating resistor 22. A switch 26 is located in a second current path 28 between the input 12 and the output 14. The switch 26 is connected to the bimetal element 24 and operated by it. During daylight, the photocell 16 has a low resistance thereby allowing current through the first current path 18. The flow of current in the first path 18 causes the heating resistor 22 to generate heat. This in turn causes the bimetal element 24 to move the switch 26 into an open position so that the load connected to the output 14 does not receive power from the source connected to the input 12. In the presence of darkness, the photocell 16 is nonconductive. This prevents the flow of current through the heating resistor 22 which in turn causes the bimetal element 24 to move the switch 26 to a closed position to connect the source to the load.

From time to time, circuits of this type need to be replaced. A problem that is encountered is that different municipal systems use different source voltages. Accordingly, there is a need for a low cost photo control that can be installed in various municipal systems, and preferably without the need for the installer to know the circuit supply voltage.

There are two known types of photocontrols directed to this purpose. A first type of photocontrols is a wide range type that will operate continuously over the entire expected voltage range (120 through 277 volts). This wide range type typically requires relatively robust components to tolerate the increased heat resulting from high voltage operation, while still having adequate sensitivity to operate at low voltage. This adds substantially to the product cost.

A second known type of photocontrol circuit is an adaptive type. An example of this known type of circuit 30 is shown in FIG. 2 wherein like components are indicated by the same numerals as in FIG. 1. This second known type of photo control circuit permanently changes its operating characteristics once connected to a high line voltage (208–277 volts), This type of circuit may be a dual-range device (120 nominal volts or 208 through 277 nominal volts) where the high voltage range operation is allowed by a series resistor 34 that limits the current in the first current path 18 when high voltage is applied. This series resistor 34 is shunted (bypassed) by a fuse 36 located in a current path 38 that bypasses the series resistor 34. The fuse 36 is of an appropriate current rating, so that, with low voltage (120 volts) applied, the current through the fuse 36 is not high enough to blow the fuse, thus the fuse remains intact and shunts the series resistor 34. In this condition, the photo control circuit 30 operates as if it were a standard single-voltage 120 volt photocontrol as in FIG. 1. However, the first time that this photocontrol circuit 30 is connected to a high voltage (208 through 277 volts), the associated higher current causes the fuse 36 to blow, removing the shunt 38 around the series resistor 34. With the fuse 36 blown, the photocontrol 30 is appropriately configured to operate in the high voltage range. The photocontrol circuit 30 of FIG. 2 is less costly than a wide range design, at the expense, however, of not being reversible, i.e. once the fuse 36 has blown, the photocontrol circuit 30 may only be used in the high voltage range, due to the series resistor. This is seldom a drawback in typical applications.

Although the adaptive type of photocontrol circuit offers a cost advantage over the wide range type, the adaptive type of photocontrol circuit also has certain disadvantages. It has been found that commercially available adaptive type photocontrols have relatively poor reliability. Conventional fuse shunts frequently blow unintentionally with only 120 volts applied due to normal power line surges. Also, the fuse shunts frequently fail to blow when required, particularly at the low tolerance end of the high voltage range, i.e., 208–15% (or 187 through 208 volts). When the fuse shunt fails to blow when required, the mating components are eventually damaged by overheating. Thus, commercially available photo controls that use such fuse shunts often do not satisfy the combined requirements of a very tight fusing current tolerance as well as a high resistance to nuisance blowing due to transient voltage surges or physical shock.

Accordingly, it is an object of the present invention to provide an improved photocontrol circuit that can be used with a wide range of source voltages and that overcomes the deficiencies of the prior art.

SUMMARY OF THE INVENTION

In order to address the aforementioned problems, there has been developed a self-configuring photoelectric control circuit for controlling operation of a load based on ambient light. The photocontrol circuit comprises a photocell responsive to ambient light, a heating resistor connected to the photocell, a bimetallic element in proximity to the heating resistor and movable in response to generation of heat from the heating resistor. A switch is operated by the bimetallic element and is connected between an input connected to a power source and an output connected to the load. A series resistor is connected to the heating resistor and a shunt is connected across the series resistor to provide a current bypass around the series resistor for operation with a low voltage power source. The shunt is maintained in a flexed condition to form the bypass and a connection of the shunt across the series resistor is formed of a meltable material. When a high voltage source is connected to the input for a duration of time, the heating resistor generates sufficient heat to cause melting of the meltable material thereby permitting relaxation of the resilient shunt, opening the bypass.

BRIEF DESCRIPTION OF THE DRAWINGS

FIG. 1 is a schematic diagram of a prior art photo control circuit.

FIG. 2 is a schematic diagram of another prior art photo control circuit.

FIG. 3 is a schematic diagram of a photo control circuit according to a first embodiment of the present invention.

FIG. 4 is a schematic diagram of a photo control circuit of FIG. 3 after having adapted to high voltage operation.

DETAILED DESCRIPTION OF THE PRESENTLY PREFERRED EMBODIMENTS

Referring to FIG. 3, there is shown a schematic diagram of a photocontrol circuit 50 according to a first embodiment of the present invention. As in prior photocontrol circuits, the photocontrol circuit 50 has an input 12 for connection to a power source, an output 14 for connection to a load, and a neutral 20. A photocell 16, a heating resistor 22, and a series resistor 34 are located in a first current path 18 between the input 12 and the neutral 20. A bimetal element 24 is in proximity to the heating resistor 22. The bimetal element 24 is connected to and operates a switch 26 that is in a second current path 28 between the input 12 and the output 14.

Located in parallel across the series resistor 34 is a thermal spring fuse 54. Specifically, the thermal spring fuse 54 is comprised of a conductive bypass wire 56 having a first end 58 solidly anchored at the junction of the series resistor 34 and the photocell 16. The second end 60 of the conductive bypass wire 56 is connected at a location 61 between the series resistor 34 and the heating resistor 22. The connection at the second end 60 of the conductive bypass wire 56 is made with a meltable solder 62. The conductive bypass wire 56 is made of a resilient material and when it is connected at both ends 58 and 60 it is under tension, i.e. the end 60 would spring away from its connection at location 61 if it were not bonded by the solder 62.

The photocontrol circuit 50 is adaptive, i.e. it is will operate when connected to various power sources having a wide range of voltages, from a low voltage of approximately 120 volts to high voltages of approximately 277 volts. When the photocontrol circuit 50 is connected to a power source of approximately 120 volts, the heat dissipated by the heating resistor 22 is sufficient to operate the bimetal element 24 and the switch 26, but is not sufficient to melt the solder 62. Thus, the bypass wire 56 shunts the series resistor 34 so that it has substantially no effect on the circuit operation.

The photocontrol circuit 50 is self-configuring for power sources of higher voltage. For example, the circuit 50 can also be used with power sources of approximately 200–277 volts. When a power source of approximately 200 or greater volts is connected to the circuit 50 of FIG. 3, the current through the heating resistor 22 causes the heating resistor 22 to dissipate more heat. The heating resistor 22 is in proximity to the meltable solder 62 and the additional heat dissipated by the heating resistor 22 when the photocontrol circuit 50 is connected to a power source having a voltage of approximately 200 volts or greater is sufficient to melt the solder connection 62 at the end 60 of the wire 56. When the solder 62 melts, in response to the temporarily overheated heating resistor 22, the tension of the bypass wire 56 causes the end 60 to spring out of the molten solder 62 and resume its relaxed position, away from the junction 61 of the series resistor 34 and the heating resistor 22. This prevents current flow in the bypass 56 so that all the current is now conducted through the series resistor 34. With all the current flowing though the series resistor 34, less heat is dissipated by the heating resistor 22 and the circuit is now configured to operate properly in the high voltage range. The heating resistor 22 cools to normal operating temperature, allowing the molten solder 62 to re-solidify. FIG. 4 shows the circuit 50 after it has adapted to operate with power sources of higher voltages.

Manufacture of the circuit 50 would be similar to that of the prior art circuits except for the connection of the tensioned bypass conductive wire 56. A resilient conductive material should be used for the wire 56. A suitable material is 304 stainless steel, copper plated or beryllium copper. In a present embodiment a wire having a size of 0.016" may be used. The connection of the fixed end 58 of the wire 56 on one side of the series resistor would be made in a conventional manner. To connect the second end 60 of the conductive bypass wire 56, the second end 60 is positioned so as to be at rest (not tensioned) at a fixed distance away from the location 61 of the junction of the series resistor 34 and the heating resistor 22. The wire 56 is bent within its elastic limit and the end 60 of the 56 wire is then attached, under tension, to the junction 61 of the series resistor 34 and the heating resistor 22, using solder with a specific melting point. In a present embodiment, the distance from the heating resistor 22 to the point 61 of attachment of the wire 56 and the melting temperature of the solder 62 are chosen so that the solder does not reach its melting temperature with 132 volts applied to the heating resistor 22, yet consistently melts when 187 volts or more is applied. In the present embodiment, the solder has a melting point of 221 to 245 degrees centigrade. In a present embodiment, the series resistor 34 has a resistance of 10K ohms and the heating resistor 22 has a resistance of 9.1K ohms.

The embodiment of the photo control illustrated in FIGS. 3 and 4 provides advantages over the known prior art devices. Compared to the adaptive type of photocontrol (shown in FIG. 2) that uses current to blow a fuse, the embodiment of the photocontrol circuit 50 of FIGS. 3 and 4 uses heat. Because the photocontrol circuit 50 is thermally triggered, it is inherently more selective than a current triggered scheme as shown in FIG. 2. Per OHM's law, current equals voltage divided by resistance, thus the current is linearly proportional to the applied voltage. The current difference between the upper tolerance of low voltage (120 volts+10%=132 volts) (when the fuse should not blow) and the low tolerance of high voltage (208 volts–10%=187 volts), (when the fuse should blow), is only 40%. Small low cost fuses lack the ability to discriminate consistently between these close current values. The heat dissipated by a heating element, on the other hand, is proportional to the dissipated wattage, which per Ohm's law, equals current squared times voltage. Therefore the same 40% increase in current results in a 98% increase in wattage and heating.

In an alternative embodiment, instead placing an end of a tensioned bypass wire in proximity to the heating resistor, an adaptive photocontrol circuit could be provided that replaces the current-sensitive fuse mechanism 36 of FIG. 2 with a commercially available thermally-sensitive fuse (e.g. a thermal cutout: "TCO") in intimate contact with the heating element. A potential drawback of such an embodiment is that some presently available TCO's respond too slowly to consistently protect the heating resistor from damage during the brief time between connection to high voltage and the time that the TCO blows. In addition, TCO's are relatively expensive. Also, some TCO designs may reclose after prolonged high temperature exposure.

By comparison, the tensioned bypass wire fuse of the above described embodiment offers an improvement over existing available thermal and current fuses due to reduced cost and increased reliability. The tensioned bypass wire fuse has a shorter thermal time constant, in general, than commercially available TCO's thus preventing damage to the heating resistor due to overheating prior to fuse blowing. Also, the tensioned bypass wire fuse has a longer thermal time constant than a current sensitive fuse, thus preventing nuisance blowing caused by transient voltage surges.

By putting the conductive wire 56 under tension so that it springs away from the bypass connection, the photocontrol circuit 50 is assured of having a positive response to the connection to the higher voltage source. Not only does this give the necessary fast response, but it is also less expensive than TCO's or current fuses.

It is intended that the foregoing detailed description be regarded as illustrative rather than limiting and that it is understood that the following claims including all equivalents are intended to define the scope of the invention.

I claim:

1. A self-configuring photoelectric control circuit for controlling operation of a load based on ambient light, comprising:

a photocell responsive to ambient light;

a heating resistor connected to said photocell;

a bimetallic element in proximity to said heating resistor and movable in response to generation of heat from said heating resistor;

a switch connected between an input connected to a source and an output connected to said load, said switch operated by said bimetallic element;

a series resistor connected to said heating resistor; and a resilient shunt connected across said series resistor to provide a current bypass around said series resistor;

wherein said shunt is maintained in a flexed condition to form said bypass; and wherein a connection of said shunt across said series resistor is formed of a meltable material such that connection to a high voltage source for a duration of time generates heat sufficient to cause melting of said meltable material thereby permitting relaxation of said resilient shunt to open said bypass.

2. The circuit of claim 1 in which said series resistor is 10K ohms.

3. The circuit of claim 1 in which said high voltage source is approximately 208–277 volts.

4. The circuit of claim 1 in which said shunt is made of a material selected from a group consisting of: (1) 304 stainless steel, copper plated, and (2) beryllium copper.

5. The circuit of claim 1 in which the meltable material has a melting point of 221 to 245 degrees centigrade.

6. The circuit of claim 1 wherein said shunt connection is in proximity to said heating resistor.

7. A circuit having an input and an output and configurable for power sources of more than one voltage, comprising:

an input for connection to a source;

an output for connection to a load;

a heating element that dissipates heat responsive to a current flow through the circuit;

a series resistor connected to said heating element; and a bypass shunt connected in parallel with said series resistor, said bypass shunt having at least one connection formed of a meltable material, said one connection located in proximity to said heating element so that dissipation of heat by said heating element above a predetermined level sufficient to melt said connection opens said bypass shunt to configure said circuit for another voltage.

8. The circuit of claim 7 further comprising:

a photocell connected to said heating element.

9. The circuit of claim 7 further comprising:

a thermally-dynamic element in proximity to said heating element.

10. The circuit of claim 7 further comprising:

a switch connected between said input and said output, said switch operated by said thermally-dynamic element.

11. The circuit of claim 9 in which said thermally dynamic element is a bimetallic element.

12. A method of self-configuring a photocontrol circuit for use with power sources of more than one voltage, comprising the steps of:

connecting an input to a power source;

connecting an output to a load;

providing a heating element in a conductive path between the input and a neutral terminal;

operating a switch in a conductive path between said input and said output in response to heat dissipated by said heating element;

bypassing a series resistor with a tensioned shunt located in the conductive path between said input and said neutral terminal;

melting a connection at an end of said shunt to allow said tensioned shunt to relax thereby preventing the bypassing of said series resistor when said input is connected to a power source of a higher voltage.

13. The method of claim 12 wherein said step of melting is performed by heat generated by said heating element.

14. The method of claim 12 further comprising the step of:

limiting the flow of current in said conductive path between said input and said neutral by means of a photocell.

15. The method of claim 12 in which said step of melting further comprises:

melting a solder connection at an end of said shunt.

16. The method of claim 15 in which said solder melting step further includes melting at approximately of 221 degrees centigrade.

17. A method of manufacturing a dual-range self-configuring photo control circuit that has an input for connection to a power source and an output for connection to a load, a photocell responsive to ambient light, a heating resistor connected to said photocell, a bimetallic element in proximity to said heating resistor and movable in response to generation of heat from said heating resistor from a first position to a second position, a switch connecting between said input and said output, said switch operated by said bimetallic element, and a series resistor connected to said heating resistor, the method comprising the steps of:

connecting one end of a shunt to a location at one end of the series resistor such that the other end of said shunt is a distance away from the other end of said series resistor;

bending said shunt so that said other end is in electrical contact with the other end of series resistor and in proximity to the heating resistor; and making a stable connection between the other end of shunt and the other end of the series resistor by means of a meltable solder so that the shunt forms a bypass across said series resistor so long as the solder does not melt.

* * * * *